United States Patent [19]

Roehm

[11] 4,259,946

[45] Apr. 7, 1981

[54] SOLAR COLLECTOR

[75] Inventor: Vincent P. Roehm, Landisville, Pa.

[73] Assignee: Thermacore, Inc., Lancaster, Pa.

[21] Appl. No.: 86,766

[22] Filed: Oct. 22, 1979

[51] Int. Cl.³ ............................ F24J 3/02; F28F 1/00
[52] U.S. Cl. .................................... 126/443; 126/446;
165/177
[58] Field of Search ............... 126/442, 443, 446, 447,
126/448, 450, 451, 417; 165/177, 178, 181, 183,
168

[56] References Cited
U.S. PATENT DOCUMENTS 3,227,153  1/1966  Godel et al. ..................... 126/448
4,122,831 10/1978  Mahdjuri .......................... 126/442
4,124,019 11/1978  Heffelfinger ..................... 126/443
4,133,298  1/1979  Hayama ........................... 126/438
4,198,955  4/1980  Dorbeck .......................... 126/443

Primary Examiner—Daniel J. O'Connor
Attorney, Agent, or Firm—Martin Fruitman

[57] ABSTRACT

An improved construction for a solar collector within a cylindrical container. The collector is a split cylindrical metal sleeve held inside another cylinder by the expansion action of a spring clip. The spring clip also expands the split sleeve so a pipe which is captured by a reentrant cavity on the outside of the sleeve is tightened within the cavity while the sleeve is tightened against the inside of the other cylinder.

4 Claims, 1 Drawing Figure

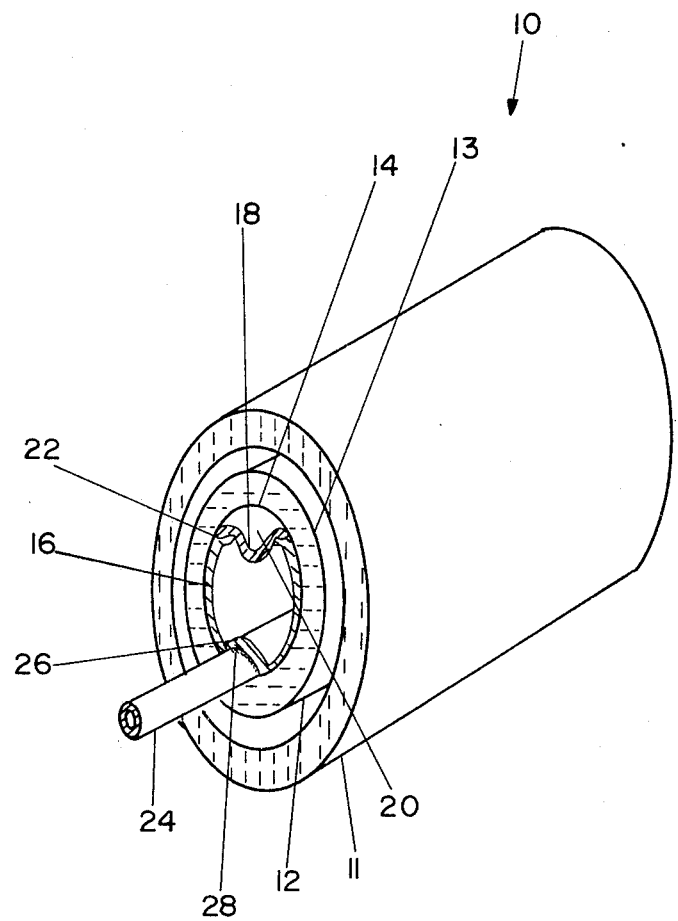

SOLAR COLLECTOR

BACKGROUND OF THE INVENTION

This invention deals generally with solar furnaces, and is more specifically pertinent to solar collectors which use liquids as a heat transfer medium.

A well known type of solar collector in use today is generally similar to a vacuum bottle. This type collector consists of an evacuated glass casing with an absorbent coating on a surface within the evacuated casing to collect the sun's energy. Associated with this outer glass enclosure there must be a means of collecting the heat and moving it away from the collecting surface for use or storage.

One such device presently in use consists of a metal sleeve, mounted within a glass cylinder, sized to remain in close contact with the inner surface of the glass cylinder. This metal sleeve transfers heat from a coating on the glass cylinder, and a liquid carrying pipe is bonded to the inside surface of the metal sleeve, so that the heat can be transferred to the liquid and carried away from the collector for storage or utilization.

Some problems arise from this construction, however. One is creating a considerable length of bond between dissimilar metals. As these metals expand and contract the differential expansion is exaggerated by length, and most bonds or welds are stressed to the point of warping or fracture. Such problems limit the structural length of the cylindrical type construction.

There is also a second problem involved in thermal expansion of the materials. Unless the inner metal sleeve and the glass cylinder are matched for thermal expansion, the contact between them will vary with temperature, and the heat transfer from the glass cylinder will be erratic. Moreover, if the thermal expansion of the parts is badly mismatched, it can result in destruction of the glass cylinder due to the severe stress to which it is subjected. Manufacturing tolerances of glass cylinders also present a problem. The variation is so great that integral inner sleeves do not operate satisfactorily and split sleeves dependant upon their own resiliency to hold them against the glass are sometimes used.

SUMMARY OF THE INVENTION

The present invention improves the heat transfer characteristics of the cylindrical type solar collector and prevents mismatched manufacturing dimensions or thermal expansion of the cylinders from causing erratic operation or damaging the collector. This is accomplished by furnishing a new configuration of inner sleeve which accommodates itself to the size and shape of the glass cylinder, even as it changes during heating and cooling. The invention also maintains excellent surface contact between the heat transfer pipe and the sleeve despite mismatched thermal expansion, thus keeping the losses at that point comparable to the losses of prior construction methods.

These benefits are attained by the use of a new split inner sleeve design which has unique features. The split runs parallel to the axis for the entire length of the sleeve and is wide enough to cause a distinct gap in the surface when the inner sleeve is placed into the glass cylinder. A separate part, a spring clip, is used to fill this gap and press the inner sleeve tightly against the inside of the glass. This spring clip is formed in an essentially "U" shaped configuration, but with lips, or some similar retaining device, to capture the edges of the split in the inner sleeve.

The spring clip is constructed with approximately the same length as the inner sleeve and, once installed, is oriented so that it protrudes into the inner volume of the inner sleeve, a space otherwise unused in the collector.

The spring clip permits the inner sleeve to accommodate to variations in the glass cylinder diameter, either due to tolerances in original manufacture or thermal changes, while maintaining intimate contact between the two cylindrical surfaces. Furthermore, the configuration of the spring clip permits an inexpensive method of construction, since it can be roll formed.

Another feature of the invention is the means for attaching liquid coolant tubing or a heat pipe for heat transfer. The attachment means is a reentrant partial cylinder positioned approximately opposite the slit in the inner sleeve. The reentrant cylinder is sized with an inside diameter slightly larger than the outside diameter of the tubing or heat pipe to be held. When the collector is assembled with the heat transfer pipe inside the reentrant cavity, the inner sleeve inside the glass cylinder, and the spring clip installed in the split, the pressure of the spring clip forces the reentrant cylinder tightly around the heat transfer pipe and assures good thermal contact over almost the entire surface of the cooling pipe, while permitting slippage between the parts if required by differing rates of thermal expansion.

This invention thus yields excellent heat flow to the heat transfer medium, ease of assembly and accommodation to thermal stresses while being less expensive to construct than previous collectors.

BRIEF DESCRIPTION OF THE DRAWING

The FIGURE is a perspective view of part of the preferred embodiment of a solar collector with a cross section in a plane approximately perpendicular to the cylindrical axis.

DETAILED DESCRIPTION OF THE INVENTION

The FIGURE shows a portion of the axial length of an evacuated solar collector 10 with a cross section shown approximately perpendicular to the axis. Evacuated outer transparent casing 11, preferably glass, forms the essential enclosure for the entire device and is closed off at its ends, which are not shown. Middle cylinder 12 is coated with a heat absorbent coating at its outer surface 13 which intercepts the solar energy. Inner metal sleeve 16, of significantly smaller circumference than inner surface 14, is held tightly against inner surface 14 by the action of spring clip 18. Spring clip 18 is held within split 20 of inner sleeve 16 by lips 22.

The expansion of inner sleeve 16, caused by spring clip 18, also retains heat transfer pipe 24 tightly within reentrant cylinder 26. With close selection of dimensions of the outer diameter of heat transfer pipe 24 and the inner diameter of reentrant cylinder 26, intimate mechanical contact and excellent heat transfer characteristics can be attained. Thermal conducting paste 28 may, however, be added to enhance the thermal conduction by filling any voids.

This clamp type of contact between reentrant cylinder 26 and heat transfer pipe 24 also relieves a severe problem of thermal stress. Previous attachment methods, such as bonding and welding, are unsatisfactory when materials of differing thermal expansions are used.

However, even in the case of very long cylinders, which greatly amplify the differences in thermal expansion, the construction of the present invention does not permit the development of stress. As heat transfer pipe 24 and inner metal sleeve 16 "grow" or "shrink" in length at different rates, they merely slip upon each other and readjust for temperature individually.

The structure shown not only improves the function of the collector by reducing thermal resistance between middle glass cylinder 12, inner sleeve 16 and heat transfer pipe 24, while reducing thermal stress, but the structure shown also greatly facilitates assembly of the collector.

Because of the action of the spring clip 18, all the parts may be assembled loosely into middle cylinder 12, as long as spring clip 18 is maintained is compression. When the compression of spring clip 18 is released, the parts automatically settle into proper orientation with required intimate contact. Moreover, with proper spring tension, all parts except spring clip 18 can be assembled, and spring clip 18 inserted afterwards, being compressed by the counter force of inner metal sleeve 16 as they are mated.

The use of the spring action also permits the use of soft material such as dead soft aluminum for inner sleeve 16 since it can be formed by rolling rather than machining and requires no inherent spring action of its own. This yields the further advantage of inner sleeve 16 being soft enough to conform to any irregularities in middle glass cylinder 12 and further enhances heat transfer by more intimate contact between the surfaces.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims. For example inner metal sleeve 16 can, with proper surface coating, act as the solar collector surface directly, and the vacuum type of construction can be replaced by other mediums. Also, the reentrant cylinder need not be constructed integral with the inner cylinder, but could be constructed separately and attached by conventional fastening methods.

What is claimed as new and desired to be secured by Letters Patent of the United States is:

1. In a solar collector of cylindrical construction wherein an inner conducting sleeve is mounted within a cylinder and a heat transfer pipe is attached to the inner conducting sleeve, said inner conducting sleeve having a split oriented parallel to its axis and its outer cross sectional circumference less than the inner cross sectional circumference of the cylinder into which it is mounted and a reentrant partial cylinder formed in said inner conducting sleeve with an inner diameter approximating the outer diameter of the heat transfer pipe; and with the heat transfer pipe positioned within said reentrant partial cylinder the improvement wherein:

a spring clip means is fitted into the split in the inner conducting sleeve to expand the inner sleeve against the inner surface of the cylinder and clamp the heat transfer pipe within the reentrant partial cylinder.

2. The solar collector of claim 1 including the further improvement comprising thermally conductive paste placed on the outer surface of the heat transfer pipe forming a void-free layer between the heat transfer pipe and reentrant partial cylinder, to permit relative movement between the heat transfer pipe and the reentrant partial cylinder while maintaining consistant thermal contact.

3. The solar collector of claim 1, including the further improvement comprising an inner conducting sleeve constructed of dead soft material which conforms to the irregularities of the inner surface of the cylinder.

4. The solar collector of claim 1 wherein the spring clip fitted into the split in the inner conducting sleeve is constructed in an essentially "U" shaped cross section with retaining means to capture the edges of the split in the inner conducting sleeve and a length approximating that of inner conducting sleeve.

* * * * *